United States Patent Office 3,767,766
Patented Oct. 23, 1973

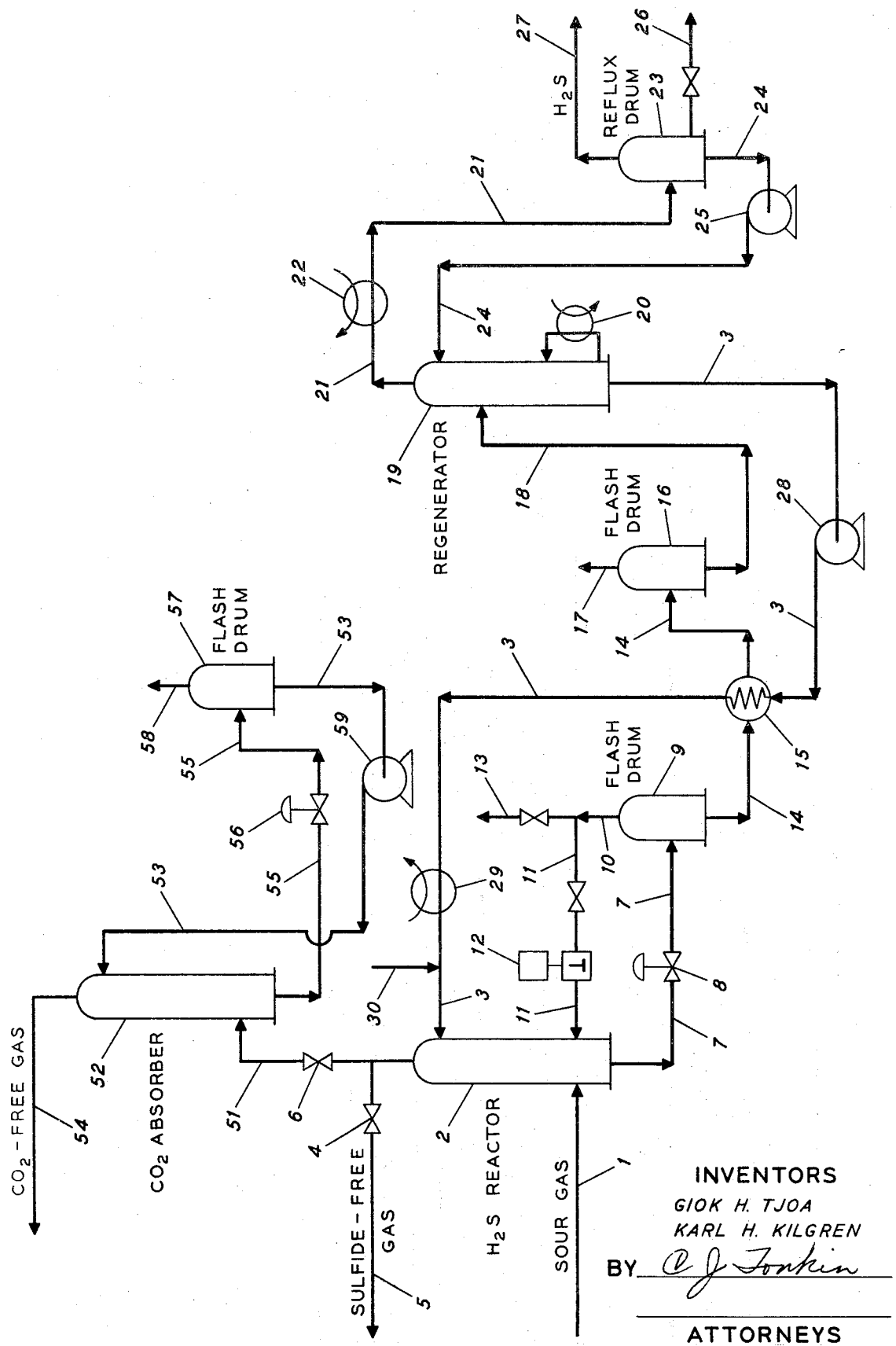

3,767,766
METHOD OF REMOVING GASEOUS SULFIDES FROM GASEOUS MIXTURES
Giok H. Tjoa, Placentia, and Karl H. Kilgren, La Habra, Calif., assignors to Chevron Research Company, San Francisco, Calif.
Continuation-in-part of abandoned application Ser. No. 851,874, Aug. 21, 1969. This application Feb. 22, 1971, Ser. No. 117,683
Int. Cl. B01d 53/34
U.S. Cl. 423—220       29 Claims

ABSTRACT OF THE DISCLOSURE

The process for selectively removing $H_2S$ and like sulfides from fluids containing them by contact with a substituted aromatic nitrile having an electron-attracting substituent on the aromatic ring at least as strong as halogen (e.g., isophthalonitrile) and an alkali hydrosulfide in a substantially hydroxyl-free solvent such as N-methyl-2-pyrrolidone. Preferably, in the process an admixture of $H_2S$ and $CO_2$ in natural gas is contacted with the substituted aromatic nitrile containing contacting solution to react the $H_2S$ with said nitrile, the $CO_2$ and/or like hydrocarbons are rejected from the contacting solution by mild heating and/or pressure reduction and thereafter $H_2S$ is regenerated by heating the remaining solution.

CROSS REFERENCE TO RELATED APPLICATION

This application is a continuation-in-part of application Ser. No. 851,874, filed Aug. 21, 1969, and now abandoned.

BACKGROUND OF THE INVENTION

This invention relates to the selective removal of sulfides such as hydrogen sulfide from fluids by contacting such fluids with certain aromatic nitriles and acid salts in an anhydrous solvent. The invention has particular application to the selective removal of hydrogen sulfide from admixtures of normally gaseous hydrocarbons, carbon dioxide and hydrogen sulfide.

Natural gas often contains appreciable amounts of $H_2S$ along with $CO_2$ and normally gaseous hydrocarbons and it is desirable to remove $H_2S$ from natural gas and similar fluids. Also, it is important to remove sulfides such as mercaptan sulfides and disulfides, as well as hydrogen sulfide, to produce fluid effluents of low residual sulfur content. In many instances, $H_2S$ must be removed in order to meet pipeline specifications (for example, to a maximum of 0.25 grain of $H_2S$ per 100 s.c.f. of gas), but the simultaneous removal of $CO_2$ is often unnecessary or undesirable.

While a multiplicity of known processes is available for the removal of acidic constituents from gas streams, all can be classified under one or a combination of four major groupings as follows: (1) processes involving an acid-base neutralization wherein the gaseous acidic component is converted to a salt (i.e., neutralization process); (2) processes involving physical solution wherein the gaseous acidic component is dissolved in a liquid solvent in accordance with the principle of Henry's law and no chemical reaction takes place (i.e., physical solution process); (3) processes involving physical permeation and adsorption of the gaseous acidic component within the pores of a suitable, solid absorbent material (i.e., adsorption process); and (4) processes involving an oxidation reaction wherein $H_2S$ and certain sulfides are oxidized to elemental sulfur or a higher state of oxidation while $CO_2$ being in its highest state of oxidation is non-reactive (i.e., oxidation process). Each of the foregoing groups of processes has characteristic properties which may be used to delineate or predict the advantages and disadvantages of any individual process included within the classification.

Thus, the neutraliation processes are essentially non-selective for $H_2S$ or $CO_2$, since both components are acidic and readily neutralized by a chemical base. The alkanolamine process, which is the most commonly employed regenerative neutralization process, utilizes water for a solvent and operates at acid gas loadings less than stoichiometrically attainable to reduce corrosion of processing equipment. Further, the chemical reaction constant for alkanolamines and $H_2S$ is such that in most instances it is economically impractical to produce a treated gas which meets pipeline specifications regarding $H_2S$ at pressures significantly less than 100 p.s.i. because of the increased reagent circulation and regeneration requirement.

Physical solution processes may show some selectivity for $H_2S$ relative to $CO_2$, but the relative preference for $H_2S$ is generally limited to severalfold rather than one or more orders of magnitude. Furthermore, the actual amount of $CO_2$ removed from the treated gas stream can be substantially larger than the quantity of $H_2S$ removed, depending on the initial concentrations of each component in the original gas stream. In general, it is economically impractical to produce a treated gas which meets pipeline $H_2S$ specifications with a physical solution process because of the high degree of solvent regeneration and high rate of solvent circulation required. Finally, $CO_2$ and hydrocarbon components dissolved in the solvent solution cannot be rejected by flashing the rich solvent to a lower pressure or heating the rich solvent to a higher temperature, because substantial quantities of $H_2S$ would be liberated concurrently in accordance with established equilibrium distribution ratios.

Physical permeation/adsorption processes are quite similar to physical solution processes with respect to the selective removal of $H_2S$ from a gas stream containing both $H_2S$ and $CO_2$. The difference in size of an $H_2S$ molecule (3.1 A.) and a $CO_2$ molecule (3.8 A.) when compared to the variation in pore sizes of treated synthetic zeolites or molecular sieves is insufficient to insure more than a modest increase in the ratio of $H_2S$ to $CO_2$ removed. Similarly, the actual quantity of $CO_2$ co-adsorbed can be substantially large, depending on its initial concentration in the gas stream, thereby reducing the capacity of the molecular sieve for $H_2S$. Furthermore, permeation/adsorption processes must be operated in a batch-wise manner which is undesirable from the standpoint of equipment duplication and recycle or disposal of the sour regeneration gas stream. Finally, this method of processing is capacity-limited and generally restricted to either low $H_2S$ concentrations, or small sour gas volumes because of physical limitations on vessel diameters and investment costs for equipment.

Oxidation processes are truly selective or specific for removing $H_2S$ and certain alkyl sulfides from admixtures of $CO_2$ and natural gas. Gaseous $H_2S$ is generally converted to elemental sulfur by any of a variety of oxidizing agents suspended on a solid support or dissolved in a suitable solvent. The iron-sponge or dry-box process, which is the most commonly used solid support process today, is a batchwise process and subject to very similar equipment duplication and capacity limitations cited for the physical permeation/adsorption process. In addition, sulfur is generally not recovered in this process but is thrown away with the spent bed material which must be replaced periodically at substantial inconvenienve to replenish the active oxidant. Liquid phase oxidation processes operate in a continuous manner and sulfur is generally recovered as a saleable product. However, these processes in general are plagued with plugging problems in flow lines and elements, since sulfur is precipitated as a solid in the liquid phase. Additional techniques and equipment such as flotation chambers and filters which are not commonly used or understood by the natural gas industry are also required. Finally, some processes (Giammarco-Vetrocoke, Thylox) employ highly toxic oxidizing agents (arsenic oxides and thioarsenates) potentially detrimental to the safety of operating personnel and public at large.

SUMMARY OF THE INVENTION

In accordance with the present invention, a process has now been found that will selectively, or specifically (depending on cycle employed) remove $H_2S$ and other sulfides from $H_2S$-$CO_2$-natural gas mixtures, wherein the foregoing cited problems are either eliminated or substantially reduced. The present invention is directed to a process for removing sulfides from fluids by contacting such fluids with an aromatic nitrile having an electron-attracting ring substituent at least as strong as halogen and an alkali hydrosulfide, or compounds capable of producing alkali hydrosulfide, in a substantially hydroxyl-free solvent. After the foregoing contacting step, the $CO_2$ which may be absorbed by the solvent is preferably rejected or desorbed by flashing the sour solution at a lower pressure and/or higher temperature.

By means of the process of the present invention the $H_2S$ and other sulfides are reacted with the contacting solution, thereby producing a fluid effluent of substantially reduced sulfide content. A major advantage of the present process is that no matter what the initial concentration of $H_2S$ is, the process can remove essentially all the $H_2S$ present, i.e., down to the last traces of $H_2S$. Thus, pipeline specification gas (less than 0.25 grain $H_2S$/100 s.c.f. of gas) or essentially completely $H_2S$-free gas (e.g., less than 0.01 grain $H_2S$/100 s.c.f. of gas) can be produced by the present process.

Additional advantages of the process are that it can be conducted at relatively low pressures such as atmospheric pressure or even subatmospheric pressure, and the contacting can be carried out at relatively high temperatures. Also, the nonaqueous contacting solutions are relatively noncorrosive. The enriched contacting solution is readily regenerated by heating with or without the aid of an inert stripping gas.

It is believed that the process involves the reaction of the sulfides with the substituted aromatic nitriles to form thioamide in the case of $H_2S$ removal or thioamide derivatives in the case of removal of mercaptans and organic mono- or disulfides. This differs from absorption of $H_2S$ in benzonitrile or N-methyl 2-pyrrolidone (U.S. Pat. No. 3,120,993). $H_2S$ absorbed in the foregoing components is released at least in part upon pressure reduction and/or mild heating, whereas $H_2S$ when reacted within stoichiometric limits with the substituted aromatic nitriles in the complex contacting solution of the present invention is not evolved upon pressure reduction or mild heating, i.e., below the point of decomposition of the reaction product of the substituted aromatic nitrile and the sulfide (e.g., below 250° F. when using isophthalonitrile in a solvent of N-methyl 2-pyrrolidone). In accordance with the present invention, the contacting solution can remove sulfides more completely than the so-called physical absorbents or solvents which are limited by an equilibrium between the partial pressure of the sulfide in the gas phase and its concentration in the liquid phase as described by Henry's law. When the substituted aromatic nitrile/$H_2S$ ratio is greater than stoichiometric, essentially all the $CO_2$ and hydrocarbons can be flashed off (by pressure reduction and/or mild heating) without release of any appreciable amount of $H_2S$.

The substituted aromatic nitriles employed in the contacting solution of the present process are those which have a relatively high chemical reactivity toward $H_2S$ and similar organic sulfides. These are the aromatic nitriles having one or more electron-attracting substituents on the aromatic ring at least as strong as a halogen substituent. In some instances, particularly with chloro substituents, higher activity is obtained with said electron-attracting substituent in the ortho position. Suitable electron-attracting substituents include CN, COOH, Cl, Br, I, F and the like. Hence suitable substituted aromatic nitriles include paraiodo benzonitrile, ortho-iodo benzonitrile, para-bromo benzonitrile, meta-bromo benzonitrile, parachloro benzonitrile, orthochloro benzonitrile, isophthalonitrile (i.e., meta cyano benzonitrile) and terphthalonitrile (i.e., para cyano benzonitrile). Derivatives of such substituted aromatic nitriles may also be employed provided that the additional groups such as methyl ring substituents do not interfere (e.g., by steric hindrance) with the desired reaction, and further provided the additional substituents do not negate the electron-attracting force of the activating substituent. The substituted aromatic nitriles other than ortho dicyanobenzene are preferred for their regenerability. Isophthalonitrile is especially preferred in view of its high reactivity, high capacity (due to the presence of 2 cyano groups which can react with $H_2S$), regenerability of its reaction products, solubility and thermal stability. For example, 15 weight percent isophthalonitrile in N-methyl-2-pyrrolidone has a crystallization point of −5° F.

Sufficient substituted aromatic nitrile is brought into contact with the sulfide-containing feed to react with at least an appreciable proportion of the sulfides present. In continuous contacting systems, the feed rate, the contact time, the rate of circulation of contacting solution and the concentration of nitrile in the contacting solution all bear on the ratio of nitrile to sulfide. Ideally for complete sulfide reaction, a stoichiometric ratio of nitrole to $H_2S$ (or equivalent S compound to be reacted) would be used, but practically a slight excess is normally used. The stoichiometric ratio is defined as one gram equivalent of nitrile on a cyano group basis for each gram equivalent of sulfide to be reacted. While it is usually preferable to exceed the stoichiometric ratio of nitrole groups to sulfide, sometimes it may be economical, particularly with high $H_2S$ partial pressures (due to high total pressure or high $H_2S$ content), to use a lower ratio, whereby part of the sulfide loading capacity of the contacting solution will depend upon the solvent selected. In general, the concentration of nitrile in the contacting solution may vary from 0.1 weight percent up to the solubility limit, preferably in the higher ranges for maximum sulfide loading of the contacting solution. For example, when using N-methyl-2-pyrrolidone as the solvent, about 15% isophthalonitrile is preferred.

The alkali hydrosulfide used in the contacting solution is believed to act as a catalyst for the reaction of the sulfides with the nitriles to form the thioamides or derivatives thereof. The alkali ion from the hydrosulfide is believed to initiate the reaction by converting the cyano carbon atom to a carbonium ion. Subsequently, the carbonium ion reacts with hydrosulfide ions (from either the alkali sulfide or the acid gas) forming a metal salt of the thiol-imide. This thiolimide salt is then converted, by undissociated $H_2S$ to the thiolimide or its tautomer, the thioamides. Simultaneously the metal ion and hydrosulfide ion are liberated and react again with unconverted nitrile closing the catalytic mechanism cycle. Therefore, the alkali hydrosulfide salts such as potassium hydrosulfide, sodium hydrosulfide, lithium hydrosulfide, ammonium hydrosulfide and dimethyl ammonium bisulfide and the like are suitable since these salts provide both the alkali ion (preferably monovalent cation of a stron base) and hydrosulfide ion which are believed necessary for the catalytic mechanism. Of the several hydrosulfides, potassium bisulfide is especially preferred because of its high catalytic activity and in addition its ease of preparation and thermal stability. Instead of the alkali hydrosulfide itself, compounds which are capable of forming alkali hydrosulfides in the contacting solution under the reaction conditions may also be used; for example, sodium sulfide and potassium hydroxide both convert to hydrosulfides in the contacting solution in the presence of $H_2S$ and hence these compounds may be used instead of the alkali hydrosulfides per se. The amount of alkali hydrosulfide present in the contacting solution preferably should be maintained at a ratio to the amount of nitrile present of 0.01 to 0.5 gram mol of hydrosulfide per gram equivalent of nitrile. Generally the upper limit on the amount of alkali hydrosulfide is determined by solubility in the contacting solution.

The solvent used in the contacting solution should be an hydroxyl-free liquid since it has been found that the presence of hydroxyl groups interferes with the process; it is believed that hydroxylated solvents such as glycols react with the alkali hydrosulfide during the regeneration of the contacting solution. In other words, the solvent should be inert during the contacting and the regeneration to the reaction products as well as the selected nitrile and alkali hydrosulfide. The solvent should be able to hold in solution the selected aromatic nitrile and hydrosulfide as well as the reaction products of the feed with the contacting solution. Also, the solvent should be thermally stable at the conditions of use.

In order to increase the reaction of the sulfides with the reagents in the contacting solution, it is preferred that the solvent have the property of readily absorbing or rapidly dissolving the $H_2S$ or other sulfides to be removed from the feed. To minimize losses throughout the processing cycle, it is preferred that the solvent have a relatively low volatility. Suitable solvents include pyrrolidones such as 2-pyrrolidone (M.P.=70° F.), N-methyl-2-pyrolidone (M.P.=12° F.), piperidones, cyclotetramethylene sulfones such as sulfolane and dimethyl sulfolane, lower alkylene carbonates such as propylene carbonate, benzonitrile, dialkyl ethers of polyethylene glycol such as 1,2-bis[2-methoxyethoxy] ethane (triglyme) or bis[2-(2-methoxyethoxy) ethyl] ether (tetraglyme), and mixtures thereof. Solvents having a high solvent power or good affinity for $H_2S$ are generally preferred. Of these, N-methyl 2-pyrrolidone is especially preferred because of its affinity for $H_2S$, low crystallization point, low vapor pressure and dissolving power for the reagent and reaction product.

As indicated above, the process is especially applicable to the preferential removal of $H_2S$ from admixtures of light hydrocarbons such as $C_1$–$C_5$ hydrocarbons, carbon dioxide and $H_2S$. A special feature of the present invention is the substantial removal of $H_2S$ from such gaseous admixture so that, for example, natural gas (predominantly methane) containing relatively small amounts of $H_2S$ (e.g., 0.25 to 100 grains of $H_2S$ per 100 s.c.f.) can be efficiently treated to produce a pipeline specification gas of below 0.25 grain of $H_2S$ per 100 s.c.f. even when the sour natural gas stream is at atmospheric or subatmospheric pressure. (1 grain $H_2S$ per 100 s.c.f. is equivalent to 15.9 p.p.m. by volume and 22.88 mg./m.$^3$).

While the process has special application to treating gases having the foregoing dilute $H_2S$ content, the process can be applied advantageously to the selective removal of $H_2S$ and like sulfides from fluids having higher concentrations of these undesirable sulfides. In addition to natural gas, other suitable feed streams include industrial gas streams (such as obtained in oil refinery operations) as well as flue gases, fuel gases and hydrogen gas streams contaminanted with sulfides. The present process can also be used to remove $H_2S$ from synthesis gas (i.e., mixture of $H_2S$ with $H_2$, CO and $CO_2$), produced by partial oxidation of sulfur-containing hydrocarbonaceous materials. A particular application is for the selective removal of $H_2S$ from Claus furnace tail gases, where the Claus furnace is run under conditions to leave some unconverted $H_2S$ in the tail gas.

Preferably the feed gas is substantially free of solids such as elemental sulfur as well as oxidizing agents, such as oxygen air or $CO_2$ which under operating conditions may convert $H_2S$ contained in the gaseous feed to elemental sulfur. Such freedom from elemental sulfur and oxygen is especially preferred with reagent solutions comprising pyrrolidones such as N-methyl-2-pyrrolidone. Oxygen (or equivalent oxidizing agents) are undesirable because it forms elemental sulfur in the solution which dissolved sulfur in turn reacts with such pyrrolidones, especially at the higher regeneration temperatures. Normally, it is desirable to have the feed contain less than .5% oxygen (or equivalent amount of other oxidizing agents), most preferably less than 0.1% oxygen. Where elemental sulfur is present in the feed, or is formed by oxidation, in quantities tending to deposit out in the treating system or otherwise interfere with the process, suitable solid separators such as filters, centrifuges, or gas-liquid dust separators may be introduced at appropriate points to remove the solid sulfur. Likewise crystallizers such as cooling tanks and settlers may be employed to precipitate out incipient solids such as dissolved elemental sulfur from the process liquid.

The process can be advantageously used to remove hydrogen sulfide and hydrocarbon derivatives thereof such as mercaptans, monosulfides and disulfides. Normally these derivatives will be lower molecular weight alkyl mercaptans and sulfides and the feeds to the process including the contaminating sulfides preferably have boiling ranges similar to natural gas, i.e., are gaseous at standard conditions.

In most instances, it is desirable to have the feed substantially dry; however, the process can be applied satisfactorily to moist gases. Usually, it is preferable to dehydrate the feed and most desirably with a dehydrating agent that does not carry over into the sulfide removal system or that, if so carried over, does not adversely affect the contacting solution in the sulfide removal system. A particularly advantageous arrangement is to use the pyrrolidones as the solvent in the contacting solution of the sulfide removal system and to use the same pyrrolidone in a pretreatment stage of contacting to dehydrate the feed gas. If there is any carryover of pyrrolidone from the dehydrating pretreatment, the pyrroline does not adversely affect the sulfide removing solution and can be easily recovered. N-methyl-2-pyrrolidone has been found to be an excellent dehydrating liquid.

The process of this invention can be carried out using contacting procedures conventional in absorption methods wherein the sulfide-containing feed is contacted with the contacting solution either batchwise or countercurrently or concurrently. While batchwise contacting can be used, it is preferred to contact the sulfide containing feed in a countercurrent absorption tower with the contacting solution in a continuous flow method. Suitable bubble cap or perforated trays, or packing such as Raschig rings or Berl saddles, or other means of insuring adequate and efficient contacting can be provided. Carbon dioxide and light hydrocarbons which become absorbed in the solvent of the contacting solution are preferably first rejected in one or more stages of flashing accomplished by reducing the pressure on the solution. A substantial portion of the aromatic and heavier hydrocarbons absorbed by the solvent may be rejected by simultaneously or suubsequently increasing the temperature of the contacting solution to a value not exceeding the decomposition temperature of the reaction products and venting the resulting vapors. Thereafter, the spent contacting soltuion is preferably regenerated by additional heating to raise the temperature of the solution above the decomposition temperature of the reaction products and effectively separating the sulfides from the liquid phase contacting solution.

In some instances, such as when processing gases of relatively low $H_2S$ concentrations (e.g., ½ mole percent $H_2S$ or less), it may be preferable to partially regenerate the spent contacting solution by a simple heat and flash cycle, thus increasing the required circulation rate of the contacting solution and thereby improving the stability of the contacting column operation. In most instances, and particularly when processing gases containing relatively high concentration of $H_2S$ (e.g., 1 mole percent $H_2S$ or higher), it is preferable to use a conventional reboiled stripping column for regenerating the spent contacting solution, thereby obtaining more complete regeneration and increased thermal efficiency in the processing cycle. In other instances, and particularly when the contacting solution contains a solvent which degrades appreciably at its normal boiling point, the spent contacting solution may be regenerated by heating together with an inert gas such as nitrogen, methane, and the like. Where the enriched contacting solution is not adversely affected, air can be a preferred inert gas and stripping agent. Also, contacting solutions which contain solvents that degrade appreciably at their normal boiling point may be regenerated by introducing a thermally stable liquid of increased volatility, e.g., benzonitrile, xylene, paraffinic hydrocarbons, and the like, into the reboiler zone and recovering the more volatile solvent in an overhead condenser for recirculation back to the reboiler zone. Regeneration time (i.e., residence time of the enriched contacting solution) depends inter alia upon the method of contacting, rate of stripping gas, if any, temperature, pressure, the nature and composition of the solution and the amount of reaction products.

The contacting step of the process is generally carried out at temperatures above that sufficient to maintain solubility of the several components of the contacting solution as well as the reaction products. The maximum temperature in the contacting zone should be that which is below the temperature at which the desired reaction of the sulfides with the nitrile is reversed. Usually the temperature will be in the range from about $-5°$ F. to no more than 250°, sometimes up to 350° F., depending upon the composition of the selected contacting solution. The pressures in the contacting step will be those which are practical such as from subatmospheric to 2000 p.s.i.g. Desirably the feed and contacting solution are brought together in continuous operations and at conditions which depend upon the sulfide content of the feed, the desired purity of product and the nature of the contacting solution. For example, with a natural gas containing 100 grains of $H_2S$ (1591 p.p.m. $H_2S$) per 100 s.c.f. of gas and with a contacting solution composed of 15 wt. percent of isophthalonitrile and 0.3 wt. percent of potassium hydrosulfide in N-methyl-2-pyrrolidone, the feed and contacting solution are brought together at a minimum rate of 0.206 gallon of contacting solution per m.c.f. of gas measured at standard conditions, the temperature being about 90° F. and the pressure being 60 p.s.i.g.

After the desired rejection of dissolved $CO_2$ and hydrocarbons, such as by flashing at reduced pressure, the contacting solution is regenerated. The regeneration is carried out at higher temperatures than those used in the contacting step for the same contacting solution. Generally the temperature of regeneration will be the minimum required to obtain dissociation of the sulfide from the contacting solution within a reasonable period of time and the pressure may be from subatmospheric to superatmospheric. Usually the regeneration pressure is below 100 p.s.i.g., and preferably in the range of 0 to 20 p.s.i.g. When the $H_2S$ or equivalent sulfide goes to a Clause furnace, the regeneration is usually carried out at about 20 p.s.i.g. The maximum temperature for regeneration is limited to prevent excessive loss or degradation of the components of the contacting solution. In most instances the regeneration temperature will be above 200° F. For example, at atmospheric pressure and with an original concentration of 7.5 wt. percent of isophthalon'trile, the regeneration temperature will be in the range of 250 to 400° F. when the solvent is N-methyl-2-pyrrolidone and 200 to 325° F. when the solvent is a mixture of sulfolane and dimethyl sulfolane.

As indicated above, $H_2S$ released in the regeneration of the contacting solution can be introduced into a Claus plant for conversion to sulfur, and this combination of steps is particularly desirable. Also, the $H_2S$ can be treated in accordance with the process of Keller U.S. Pat. 3,401,101 or can be converted to sodium sulfide by contacting with an aqueous caustic solution.

Further, the contacting solution can be purified by intermittently or continuously withdrawing a portion of the solution and separately treating it to remove impurities. Alternately the solvent can be reclaimed and the solution reconstituted. For example, when contacting solution is composed of the preferred components: isophthalonitrile, potassium hydrosulfide and N-methyl-2-pyrrolidone solvent, a slip stream of the contacting solution can be withdrawn periodically for reclamation. The withdrawn solution may be 10–50% of the circulating solution. After withdrawal from the circulating system, the solution is preferably diluted with water in sufficient amount to precipiate the isophthalonitrile and degradation products. The precipitates can be allowed to settle and the solvent-water mixture separated by decanting, or the precipitates can be removed by filtration. The N-methyl-2-pyrrolidone solvent can be recovered from the resulting aqueous solution by distilling off the water, and the dried N-methyl-2-pyrrolidone can be reconstituted with isophthalonitrile and potassium hydrosulfide additions for reintroduction into the circulating system.

Since the present invention involves a selective reaction of $H_2S$ and like sulfides with the substituted aromatic nitriles, the process can be used to remove all or any portion of the sulfide content of the feed. Thus, the process applies to removal of $H_2S$ in any concentration from $H_2S$-containing gases and is particularly applicable to purification of gases having low partial pressures of $H_2S$ such as below 0.1 p.s.i. of $H_2S$. Thus, the process can remove sufficient $H_2S$, i.e., so the gas meets pipeline specification (0.25 grain $H_2S$/100 s.c.f. of gas) or can remove all the $H_2S$. Although the process can be used to remove effectively $H_2S$ from gases containing little or no other acidic components, the process is especially effective in selectively removing $H_2S$ from gases containing appreciable amounts of $CO_2$.

DESCRIPTION OF THE DRAWING

The invention will be more fully understood by reference to FIG. 1 and the following description which illustrate a preferred process flow of the present invention: a feed gaseous mixture such as sour natural gas containing $H_2S$ and $CO_2$ is fed through line 1 into the bottom portion of contactor 2. Contacting solution such a N-methyl-2-pyrrolidone containing 15 wt. percent of isophthalonitrile and 0.3 wt. percent of potassium hydrosulfide, is introduced into the upper portion of contactor 2 through line 3. Contactor 2 can be any suitable contacting column containing appropriate packing or trays to assure intimate countercurrent contact of the rising gaseous feed with the downwardly flowing contacting solution. Contactor 2 is maintained under such conditions of temperature and relative flow rates so that $H_2S$ is selectively reacted with substituted aromatic nitrile within the stoichiometric limit, $CO_2$ being absorbed by the solvent to the extent determined by the conditions and amounts present.

Gas of substantially reduced $H_2S$ content is removed from the contactor and sent to the sales gas pipeline as purified gas via line 5 through valve 4, valve 6 being in a closed position.

Th sulfide-enriched contacting solution is withdrawn from contactor 2 through line 7. If the withdrawn solution contains substantial amounts of dissolved $CO_2$ and/or hydrocarbons, as may occur at the higher contacting pressures, the solution can be passed through an expansion valve 8 to flash zone 9 for controlled pressure reduction to vaporize such dissolved $CO_2$ and/or hydrocarbons which are removed overhead via line 10, either for recycle to contactor 2 through line 11 and compressor 12, or other disposal via line 13.

The liquid withdrawn via line 14 from flash zone 9 (or, in the event the flash zone is omitted, the sulfide-enriched solution withdrawn from contactor 2) is passed through heat exchanger 15 into a second flash zone 16 where additional hydrocarbons and residual $CO_2$ can be removed via line 17 for suitable disposal. The liquid withdrawn via line 18 is passed to an intermediate point in a conventional stripping column 19 which is equipped with a reboiler 20 and which is operated under condtions to substantially regenerate the contacting solution. The $H_2S$-rich gas stream is removed overhead by means of line 21, passed through condenser 22 where vaporized solvent and hydrocarbons are condensed, then routed to reflux drum 23. The liquid phase is continuously removed from drum 23 by means of line 24 and returned via pump 25 to the top of column 19 to serve as reflux. Hydrocarbons which are not miscible with the condensed solvent can be withdrawn either continuously or intermittently via line 26 for suitable disposal. Concentrated $H_2S$ is removed from drum 23 via overhead line 27 for appropriate disposal such as to a Claus furnace or acid plant. The regenerated contacting solution is withdrawn from the bottom of column 19 through line 3 and returned via pump 28 to column 2, passing in turn through heat exchanger 15 and cooler 29 which reduce the temperature of the solution to the desired contacting temperature. Make-up solution may be added via line 30.

When it is desired to reduce the $CO_2$ content of the sulfide-free gas stream 5 below that obtainable with the stoichiometric circulation rate of contacting solution before mentioned (e.g., particularly when the $CO_2$ content and pressure of sour feed gas stream 1 are high), the sufide-free gas is preferably passed to a second contactor 52 via valve 6 and line 51, valve 4 being closed. To avoid contamination of solvents, and to assist in the possible recovery of solvent from the gas stream leaving the first contactor, it is most desirable to employ the same liquid for a solvent in the contacting solution used in column 2 as is used for the absorbent in column 52. A suitable liquid for such purpose is, for example, N-methyl-2-pyrrolidone. In the second contactor 52, sufficient solvent is circulated to absorb the additional amount of $CO_2$ necessary to reduce the $CO_2$ content of the $H_2S$-free gas leaving contactor 52 via line 54 to the desired value. The solvent containing $CO_2$ withdrawn from contactor 52 is passed via line 55 through pressure reducer 56 to flash drum 57 (or other suitable solvent-$CO_2$ separator) and $CO_2$ is withdrawn for disposal through line 58. Regenerated solvent is recycled by means of line 53 and pump 59 back to the top of contactor 52.

When the $H_2S$ content and pressure of sour feed stream are low (e.g., less than 0.5 mol percent $H_2S$ and 100 p.s.i.), regeneration of the contacting solution may be accomplished preferably by a simple heat and flash cycle. In such cycle, all or a portion of the sulfide-rich contacting solution from the bottom of contactor is flashed to essentially atmospheric pressure through heat exchange to a heater wherein the temperature of the solution is raised to a value above that at which the reaction product decomposes, thence into an appropriate flash drum where $H_2S$ is removed via an overhead stream for suitable disposal and the partially regenerated contacting solution is removed via a bottom stream and pumped back to the top of contactor through suitable heat exchange and cooling. The circulation rate of contacting solution through the regeneration cycle depends inter alia upon the regeneration temperature and residence time as well as the pressure and $H_2S$ content of the sour feed stream. That portion of the sulfide-rich contacting solution which is not subjected to regeneration is recycled back to the top of the contactor where it is mixed with the partially regenerated solution prior to entering the column.

In the foregoing description in reference to the figure, various auxiliary equipment and processing alternatives have been eliminated for the sake of simplicity. For example, in place of expansion valves 8 and 56 turbo expanders can be used with the power offtakes arranged to drive solution pumps 28 and 59, to recompress flash gas streams 13 and 58, or like means of expansion energy recovery. Also, the sulfide-rich and $CO_2$-rich contacting solution pressures may be reduced in two or more stages, thereby enhancing power recovery or optimizing heat exchange. Further, appropriate heat exchange may be desirable at each expansion stage to avoid low solution temperatures resulting from isenthalpic or isentropic expansion. Also, regeneration of the sulfide-rich contacting solution can be assisted by introducing an inert gas or vapor into the lower portion of the regeneration column. Further, a slip stream of the regenerated contacting solution can be withdrawn continuously or intermittently for removal of accumulated minor impurities and purified as indicated above.

In some instances (e.g., at low processing pressures or when a relatively volatile solvent is used in the contacting solution), supplemental means may be desirable for recovering vaporized solvent from the sweetened gas stream. One suitable means consists of intimately contacting the sweetened gas stream with a liquid which is miscible with the solvent of the contacting solution, separating the solvent-rich liquid from the sweet gas, and subsequently distilling the liquid mixture to recover the solvent. When using the preferred solvent of the present invention, N-methyl-2-pyrrolidone, the wash liquid can be water in which case the solvent is recovered as a kettle product in the distillation step, or the wash liquid may be sulfolane in which case the solvent is recovered as a distillate in the distillation step. In general, a nonaqueous solvent of low volatility is preferred as the wash liquid so that the dehydrated gas will not be resaturated with water. Another method for accomplishing the desired solvent recovery consists of chilling the sweetened gas stream and recovering a substantial portion of the vaporized solvent as a condensate product. Either method can also be applied to recover solvent from the concentrated $H_2S$ stream produced in the regeneration of the sulfide-rich contacting solution.

Where the feed contains elemental sulfur, a dust prevent this sulfur from being introduced to the sweetening reactor. If elemental sulfur becomes dissolved in the contacting solution, a crystallizer can be placed in the line withdrawing liquids from the reactor; such crystallizer can be formed with a cooling coil and a settling chamber; elemental sulfur is precipitated out and the supernatant liquid passed on the regenerator section.

In the following examples, the test procedure was carried out as follows, unless otherwise indicated: 125 ml. of the contacting solution under test was placed in a gas-absorption bottle having a fritted porcelain disk near the bottom and above the gas inlet to insure uniform gas distribution into the liquid. Berl saddles of 1 cm. were also placed in the bottle above the fritted disk to promote gas-liquid contact. A natural gas stream containing a known amount of sulfide, e.g., $H_2S$, was bubbled through the solution at a rate of 250–280 cc./min. A bypass line is provided to enable analysis of the feed gas stream without passing through the contacting solution in the gas absorption bottle. With the aid of suitable valving, the feed gas or the treated gas stream was analyzed in a continuous manner by a calibrated automatic recording $H_2S$ analyzer. Thus, the feed gas passed through the bypass line was first analyzed; then, after changing the valving to close off the bypass line and to direct the gas through the absorption bottle, and after allowing about 2 minutes for displacement of inert gas from the bottle, the treated gas was analyzed.

EXAMPLE 1

Using the above-described testing procedure, a sour natural gas was passed through a contacting solution containing 5.87 mol percent isophthalonitrile and 0.51 mol percent potassium hydrosulfide in N-methyl-2-pyrrolidone. Reaction conditions were 72–74° F. and 1 atmosphere total pressure. Analyses of the inlet and outlet gases for $N_2$, $C_{1-3}$ hydrocarbons, $CO_2$ and $H_2S$, were as follows:

| Compound | Inlet | Outlet |
|---|---|---|
| $N_2$ (mol percent) | 1.06 | 1.03 |
| $C_1$ (mol percent) | 88.52 | 88.57 |
| $C_2$ (mol percent) | 8.46 | 8.53 |
| $CO_2$ (mol percent) | 1.77 | 1.68 |
| $C_3$ (mol percent) | 0.19 | 0.19 |
| Total | 100.00 | 100.00 |
| $H_2S$ (gr./100 s.c.f.) | 17.1 | 0.12 |

These results illustrate that at the extremely low partial pressure of $H_2S$ (i.e., 0.207 mm. Hg), substantially all of the $H_2S$ is selectively reacted and removed, in the presence of $CO_2$, from natural gas.

EXAMPLE 2

A sour natural gas was passed through a solution of 5.88 mol percent isophthalonitrile and 0.51 mol percent potassium hydrosulfide in sulfolane. Reaction conditions were 72–74° F. and 1 atmosphere total pressure. Analyses of the inlet and outlet gases were as follows:

| Compound | Inlet | Outlet |
|---|---|---|
| $N_2$ (mol percent) | 1.07 | 1.06 |
| $C_1$ (mol percent) | 88.64 | 88.70 |
| $C_2$ (mol percent) | 8.30 | 8.24 |
| $CO_2$ (mol percent) | 1.82 | 1.83 |
| $C_3$ (mol percent) | 0.17 | 0.17 |
| Total | 100.00 | 100.00 |
| $H_2S$ (gr./100 s.c.f.) | 17.4 | 0.46 |

These results illustrate also that $H_2S$ is selectively reacted and removed from natural gas with a contacting solution of the present invention.

EXAMPLE 3

Feed gas containing 17.5 gr. $H_2S$/100 s.c.f. was bubbled through two different contacting solutions at 75° F. at 1 atmosphere total pressure. Both contacting solutions A and B contained 5.87 mol percent of isophthalonitrile in N-methyl-2-pyrrolidone. 0.5 mol percent of potassium hydrosulfide was added to solution A but not to solution B. The resulting solutions have the following $H_2S$ capacities.

| Contacting solution: | Capacity (g. mol $H_2S$/100 ml. soln.) |
|---|---|
| A (KHS added) | $13.00 \times 10^{-5}$ |
| B (no KHS) | $2.74 \times 10^{-5}$ |

These results illustrate that the loading capacity of the contacting solution is greatly increased (i.e., 4750 times greater) with the addition of the alkali hydrosulfide.

EXAMPLE 4

Using the standard test procedure and reaction conditions of 95° F. and 1 atmosphere total pressure, feed gases of varying $H_2S$ content were passed through several different contacting solutions. The amounts of $H_2S$ in the feed gas and the treated gas as well as the composition of the several contacting solutions are given in the following table:

TABLE I

| Feed gas | | | Treated gas | | | |
|---|---|---|---|---|---|---|
| Gr. $H_2S$/ 100 s.c.f. | P.p.m. $H_2S$ | P.p (mm. Hg) $H_2S$ | Gr. $H_2S$/ 100 s.c.f. | P.p.m. $H_2S$ | P.p. (mm. Hg) $H_2S$ | Contacting solution |
| 16.8 | 267 | 0.203 | 0.12 | 1.9 | 0.0014 | |
| 40.1 | 638 | .484 | 0.48 | 7.6 | .0058 | |
| 69.9 | 1,112 | .844 | 1.04 | 16.5 | .0126 | 5.87 mol percent isophthalonitrile plus 0.51 mol percent KHS plus N-methyl-2-pyrrolidone. |
| 79.3 | 1,262 | .958 | 2.11 | 33.6 | .0255 | |
| 103 | 1,639 | 1.244 | 9.52 | 151 | .115 | |
| 130 | 2,068 | 1.570 | 22.5 | 358 | .272 | |
| 0.71 | 11.3 | 0.009 | 0.03 | 0.48 | 0.0004 | |
| 1.71 | 27.2 | .021 | 0.05 | 0.80 | .0006 | |
| 2.58 | 41.0 | .031 | 0.08 | 1.3 | .0010 | |
| 4.96 | 78.9 | .060 | 0.16 | 2.5 | .0019 | |
| 10.7 | 170 | .129 | 0.23 | 3.7 | .0028 | |
| 11.2 | 178 | .135 | 0.26 | 4.1 | .0031 | 5.88 mol percent isophthalonitrile plus 0.51 mol percent KHS plus sulfolane. |
| 18.3 | 291 | .221 | 0.35 | 5.6 | .0042 | |
| 45.7 | 727 | .552 | 0.83 | 13.2 | .0100 | |
| 66.4 | 1,056 | .802 | 3.59 | 57.1 | .0434 | |
| 91.0 | 1,448 | 1.099 | 9.68 | 154 | .117 | |
| 108 | 1,718 | 1.305 | 17.1 | 272 | .207 | |
| 128 | 2,036 | 1.546 | 27.6 | 439 | .333 | |
| 5.98 | 95.1 | .072 | 1.19 | 18.9 | 0.0144 | |
| 16.8 | 267 | .203 | 3.55 | 56.6 | .0429 | |
| 40.1 | 638 | .484 | 12.5 | 199 | .151 | 11.57 mol percent m-Br-benzonitrile plus 0.55 mol percent KHS plus N-methyl-2-pyrrolidone. |
| 69.9 | 1,112 | .844 | 30.1 | 479 | .364 | |
| 79.3 | 1,262 | .958 | 35.9 | 571 | .434 | |
| 103 | 1,639 | 1.244 | 54.1 | 861 | .654 | |
| 1.12 | 17.8 | 0.014 | 1.10 | 17.5 | 0.013 | |
| 17.0 | 270 | .205 | 17.2 | 274 | .208 | 11.57 mol percent benzonitrile plus 0.55 mol percent KHS plus N-methy 2pyrrolidine. |
| 39.9 | 635 | .482 | 40.0 | 636 | .483 | |
| 69.8 | 1,111 | .843 | 69.6 | 1,107 | .841 | |

These data show that the isophthalonitrile reagent is more active than m-bromo-benzonitrile. Benzonitrile shows no activity under the experimental conditions chosen for these experiments.

EXAMPLE 5

To determine the applicability of the present process for removing sulfides other than hydrogen sulfide, the below described contacting solutions were used; according to the test procedure, with gas streams containing known amounts of methylmercaptan, diethylsulfide and diethyldisulfide. These gas streams were prepared by adding the indicated amounts of sulfides to natural gas containing less than 0.10 grain of $H_2S$/100 s.c.f. of gas and about 2 mol percent of $CO_2$.

Contacting solution A was composed of 9.5 wt. percent isophthalonitrile, 0.7 wt. percent potassium hydrosulfide and the remainder N-methyl-2-pyrrolidone. Contacting solution B was composed of 9.5 wt. percent of isophthalonitrile in N-methyl-2-pyrrolidone. Contacting solution C was composed of N-methyl-2-pyrrolidone alone. All experiments were conducted at room temperature and one atmosphere total pressure. By measuring the contents of sulfides in the inlet and outlet streams with an automatic recording sulfur analyzer, the equilibrium data set forth in the following table were obtained.

TABLE II

| Contacting solution | Sour component used | Grains sulfur/100 s.c.f. in— Inlet gas | Outlet gas | S conc. ratio inlet/outlet |
|---|---|---|---|---|
| A | $CH_3SH$ | 17.3 | 0.21 | 82 |
| A | $CH_3SH$ | 7.28 | 0.08 | 91 |
| A | $CH_3SH$ | 1.34 | 0.00 | ∞ |
| B | $CH_3SH$ | 7.28 | 7.28 | 1 |
| C | $CH_3SH$ | 7.28 | 7.28 | 1 |
| A | $(C_2H_5)_2S$ | 6.85 | 0.92 | 7.4 |
| A | $(C_2H_5)_2S$ | 2.94 | 0.23 | 12.8 |
| A | $(C_2H_5)_2S$ | 0.74 | 0.06 | 12.3 |
| B | $(C_2H_5)_2S$ | 2.94 | 2.94 | 1 |
| C | $(C_2H_5)_2S$ | 2.94 | 2.94 | 1 |
| A | $(C_2H_5)_2S_2$ | 6.58 | 1.46 | 4.5 |
| A | $(C_2H_5)_2S_2$ | 3.54 | 0.86 | 4.1 |
| B | $(C_2H_5)_2S_2$ | 3.54 | 3.54 | 1 |
| C | $(C_2H_5)_2S_2$ | 3.54 | 3.54 | 1 |

The foregoing results illustrate that mercaptans and sulfides can be also removed by the process of the present invention.

EXAMPLE 6

In this example, potassium hydroxide and sodium sulfide were used as examples of compounds which are readily available commercially and appear to be converted to hydrosulfide during the course of the reaction. These data illustrate that hydrosulfides can be formed in situ. The data also show that NaHS has catalytic activity, although to a lesser degree than KHS.

EXAMPLE 7

Sweetening activities of isophthalonitrile solutions as a function of $H_2S$ loading are shown on Table IV. (Sweetening activity determined by our standard test at 1 atm. total pressure.)

Solution A was composed of 7.47 mol percent of isophthalonitrile and 0.47 mol percent of potassium hydroxide in N-methyl-2-pyrrolidone. Solution B was the same except that sodium sulfide was substituted for the potassium hydroxide of solution A. These solutions were first saturated with $H_2S$ and then regenerated by heating them to 280° F. for 30 minutes and stripping with nitrogen at a flow rate of 200 ml. per minute. The resulting regenerated contacting solutions were then subjected to sour gas streams according to the prescribed test procedure, the reaction conditions being 85° F. and 14.7 p.s.i.g. The $H_2S$ content of the inlet and outlet gas streams were as follows:

TABLE III

| Solution | Grains $H_2S$/100 s.c.f. in— Inlet gas | Outlet gas | $H_2S$ concentration ratio, inlet/outlet |
|---|---|---|---|
| A | 17.6 | 0.12 | 147 |
| A | 6.92 | 0.03 | 231 |
| A | 1.27 | 0.00 | ∞ |
| B | 17.8 | 0.19 | 94 |
| B | 6.35 | 0.07 | 91 |
| B | 2.02 | 0.01 | 202 |

TABLE IV

| Contacting solution | Initial loading S.c.f. $H_2S$/gallon | Percent of theoretical stoichiometric $H_2S$ capacity | Temp., °F. | $H_2S$ concen. (grains $H_2S$/100 s.c.f.) of— Feed gas | Treated gas |
|---|---|---|---|---|---|
| 15 weight percent isophthalonitrile plus 0.28 weight percent KHS in N-methyl-2-pyrrolidone. | 0 | 0 | 95 | 103 | 9.52 |
| | | | | 16.8 | 0.12 |
| | 4.48 | 58 | 85 | 105 | 10.3 |
| | | | | 16.9 | 0.08 |
| (Theoretical stoichiometric $H_2S$ capacity; 7.73 s.c.f. $H_2S$/gallon) | 6.73 | 87 | 85 | 106 | 10.6 |
| | | | | 17.6 | 0.08 |
| | 7.42 | 96 | 85 | 106 | 10.4 |
| | | | | 17.9 | 0.10 |
| 5 weight percent isophthalonitrile plus 0.34 weight percent KHS in sulfolane. | 0 | 0 | 95 | 108 | 17.1 |
| | | | | 18.3 | 0.35 |
| | | | | 4.96 | 0.16 |
| | 1.07 | 53 | 85 | 106 | 23.3 |
| | | | | 17.9 | 2.32 |
| | | | | 3.38 | 0.08 |
| (Theoretical stoichiometric $H_2S$ capacity; 2.02 s.c.f. $H_2S$/gallon) | 1.60 | 79 | 85 | 108 | 24.0 |
| | | | | 17.9 | 2.28 |
| | | | | 3.37 | 0.08 |
| | 1.86 | 92 | 85 | 108 | 23.9 |
| | | | | 17.8 | 2.35 |
| | | | | 3.38 | 0.08 |

This example illustrates that the sweetening activity of the contacting solution of the present invention is independent of the initial loading for all practical purposes, provided this loading is maintained below the theoretical stoichiometric value.

EXAMPLE 8

12 ml. samples of a contacting solution composed of 7.42 wt. percent isophthalonitrile and 0.55 wt. percent potassium hydrosulfide in sulfolane, all presaturated with $H_2S$, were regenerated at different times at 325° F. while bubbling therethrough a stream of nitrogen at a rate of 50 ml. per minute. The isophthalonitrile contents of the solution were determined as a measure of the completeness of the regeneration of the contacting solutions and the results are given in the following table:

TABLE V

| Regen. time (min.) | Wt. percent isophthalonitrile in solution | Percent regenerated |
| --- | --- | --- |
| 5 | 2.29 | 30.9 |
| 10 | 3.15 | 42.5 |
| 20 | 4.60 | 62.0 |
| 40 | 5.42 | 73.0 |
| 60 | 6.78 | 91.4 |
| 80 | 6.01 | 81.0 |

The above results illustrate that a contacting solution of the present invention can be regenerated effectively at a temperature of 325° F. and that the longer times give a more complete regeneration of the contacting solution.

EXAMPLE 9

A contacting solution composed of 7.5 wt. percent of isophthalonitrile and 0.52 wt. percent potassium hydrosulfide in sulfolane was presaturated with $H_2S$. Aliquots of 12 ml. were regenerated at different temperatures by bubbling nitrogen at a 50 ml. per minutes rate for 20 minutes. After regeneration the isophthalonitrile content was determined and the results shown in the following table.

Tablh VI

| Regen. temp. ° F. | Weight percent isophthalonitrile found in solution | Percent regeneration |
| --- | --- | --- |
| 200 | 1.58 | 21.1 |
| 250 | 2.30 | 30.7 |
| 280 | 3.18 | 42.4 |
| 300 | 3.88 | 51.7 |
| 325 | 4.69 | 62.5 |
| 350 | 5.25 | 70.0 |
| 375 | 5.15 | 68.7 |
| 400 | 5.30 | 70.7 |

The above results illustrate that the contacting solution can be regenerated at elevated temperatures and more complete regenerations are obtained at higher regeneration temperatures.

EXAMPLE 10

Samples of a contacting solution composed of 7.5 wt. percent isophthalonitrile and 0.55 wt. percent potassium hydrosulfide in N-methyl-2-pyrrolidone, presaturated with $H_2S$, were regenerated at varying temperatures with the regeneration time kept constant at 20 minutes and with the other conditions the same as in Example 9. The results are shown in the following Table VII.

TABLE VII

| Regen. temp. ° F. | Weight percent isophthalonitrile found in solution | Percent regeneration |
| --- | --- | --- |
| 200 | 0 | 0 |
| 250 | 0 | 0 |
| 280 | 1.94 | 25.9 |
| 300 | 3.41 | 45.5 |
| 325 | 4.90 | 65.3 |
| 350 | 6.15 | 82.0 |
| 375 | 6.94 | 92.5 |
| 400 | 7.50 | 100.00 |

The above results illustrate that the contacting solution can be regenerated at an elevated temperature. More complete regenerations are obtained at the higher regeneration temperatures, while below 250° F. no regeneration occurs.

EXAMPLE 11

The same solution as used in Example 10 was regenerated after presaturation with $H_2S$ at varying times while the regeneration temperature was kept at 280° F. and the other conditions the same as in Example 8. The results are shown in the following Table VIII.

TABLE VIII

| Regen. time (min.) | Weight percent isophthalonitrile found in solution | Percent regeneration |
| --- | --- | --- |
| 5 | 1.26 | 16.8 |
| 10 | 1.65 | 22.0 |
| 20 | 2.02 | 26.9 |
| 40 | 2.65 | 35.3 |
| 60 | 2.93 | 39.1 |
| 80 | 3.09 | 41.2 |

These results illustrate that the contacting solution can be regenerated at elevated temperatures and that the longer times give a more complete regeneration.

EXAMPLE 12

Reaction-thermal regeneration cycling tests were carried out as follows with a contacting solution composed of 7.5 wt. percent isophthalonitrile+0.5 wt. percent potassium hydrosulfide in sulfolane. Using the test procedure, feed gas was passed through the contacting solution (fresh solution in the first cycle and regenerated solutions from the previous cycle in the subsequent cycles) and the $H_2S$ content of the inlet and outlet gases were determined. The reaction portion of the cycle was carried out at 85° F. and 1 atmosphere pressure. After determining the sweetening activity from the difference of the $H_2S$ content saturated with $H_2S$. Thereafter the resulting saturated solution was heated to 280° F. for 20 minutes as indicated below, after which the solution was allowed to cool to the reaction test procedure temperature. During the heating and cooling in such regeneration a nitrogen stream flowing at 150 ml. per minute was bubbled through the contacting solution. An aliquot sample of the cooled contacting solution was analyzed for isophthalonitrile content. The thermally regenerated solution was then used again in the reaction cycle to determine the solution's sweetening activity, thus closing one cycle of the test procedure. The results of these cycling experiments are given in the following table:

TABLE IX

| Cycle No. | Grains H₂S/100 s.c.f. in— | |
|---|---|---|
| | Inlet gas | Outlet gas |
| 0 (Virgin soln.) | 16.9 | 5.80 |
| 1 | 17.5 | 1.46 |
| 2 | 17.4 | 1.48 |
| 3 | 17.3 | 1.34 |
| 4 | 17.6 | 1.35 |
| 5 | 17.6 | 1.40 |
| 6 | 17.3 | 1.28 |
| 7 | 17.8 | 1.23 |
| 8 | 17.8 | 1.33 |
| 9 | 17.6 | 1.21 |
| 10 | 17.3 | 1.18 |
| 11 | 17.8 | 1.27 |
| 12 | 17.6 | 1.24 |
| 13 | 17.5 | 1.30 |

EXAMPLE 13

Reaction-thermal regeneration cycling tests were made also with a contacting solution composed of 7.5 wt. percent isophthalonitrile+0.5 wt. percent potassium hydrosulfide in N-methyl - 2 - pyrrolidone. The test procedure was identical to the procedure mentioned in Example 12. Results of these cycling experiments are given in the following table:

TABLE X

| Cycle No. | Grains H₂S/100 s.c.f. in— | |
|---|---|---|
| | Inlet gas | Outlet gas |
| Virgin soln. | 17.4 | 0.23 |
| 1 | 17.6 | 0.00 |
| 2 | 17.3 | 0.00 |
| 3 | 17.6 | 0.18 |
| 4 | 17.5 | 0.23 |
| 5 | 17.9 | 0.30 |
| 6 | 17.6 | 0.00 |
| 7 | 17.8 | 0.15 |
| 8 | 17.9 | 0.35 |
| 9 | 17.6 | 0.12 |
| 10 | 17.8 | 0.15 |
| 11 | 17.0 | 0.12 |

The results of Tables IX and X illustrate that the contacting solution can be repeatedly regenerated and still maintain their sweetening activity.

EXAMPLE 14

For applications where complete regeneration is not necessary, such as in a process cycle for the removal of low concentrations H₂S, a simple heat-flash regeneration can be utilized. To demonstrate this feasibility, the following experiment was conducted:

In a cylinder, partly filled with the contacting solution (15 wt. percent isophthalonitrile+0.28 wt. percent KHS in N-methyl - 2 - pyrrolidone), the solution was loaded with H₂S to about three-fourths of its theoretical stoichiometric capacity based upon the isophthalonitrile content. This partially H₂S-saturated solution was then saturated with natural gas at 60 p.s.i.g. While maintaining 60 p.s.i.g. pressure on the gas cap, the solution was metered into a thermostatically heated coil via a pressure reduction valve. The resulting gas-liquid mixture, now at atmospheric pressure, was separated in a glass separator. The rates of both gas and liquid coming from this separator were measured as was the temperature of the fluid coming into this separator. The H₂S-content of the gas from the separator was determined also. Since the flow rates of the gas and liquids, the H₂S content of the gas, the length and the diameter of the coil are known, the efficiency of regeneration as function of temperature and residence time in the coil can be calculated. The following results were obtained.

TABLE XI

| Residence time in heated coil (min.) | Percent regeneration (100% regeneration=7.73 s.c.f. H₂S/ gallon soln.) | Fluid temp. at heated coil exit, °F. |
|---|---|---|
| 1.24 | 6.6 | 310 |
| 2.08 | 10.9 | 322 |
| 2.85 | 14.5 | 324 |
| 3.96 | 17.0 | 317 |
| 4.23 | 18.3 | 316 |
| 1.22 | 16.4 | 358 |
| 1.80 | 25.0 | 369 |
| 2.60 | 32.4 | 376 |
| 4.04 | 41.6 | 366 |
| 5.95 | 47.8 | 363 |
| 5.75 | 51.6 | 362 |

These results indicate that partial regeneration is feasible by employing a simple heat-flash procedure. The data also indicate that more complete regenerations were obtained at higher temperatures and longer contact time.

EXAMPLE 15

A continuous regeneration experiment was conducted in the following manner:

A feed stream of H₂S-saturated solution of 15 wt. percent isophthalonitrile+0.28 wt. percent KHS in N-methyl-2-pyrrolidone was preheated to 330° F. and regenerated in a laboratory Oldershaw column (34 mm. ID, 20 actual trays). The stream was introduced on the 5th tray (counting from the top) at a rate of 2 liters/hour. Nitrogen stripping gas was bubbled through the reboiler, which was maintained at 400° F., at a rate of 1 liter/min. (0° C. and 760 mm. Hg STP). By means of auxiliary heating mantles on the column, the temperature profile between the feed tray and the reboiler was maintained approximately linear between 330 and 400° F. Total sulfur analyses on the feed and regenerated liquid streams indicated that 72–76% regenerations were achieved in this manner.

EXAMPLE 16

A feed gas having an H₂S partial pressure of .0086 mm. Hg was passed through, in accordance with the test procedure, a contacting solution composed of 5.88 mol percent isophthalonitrile+0.51 mol percent potassium hydrosulfide in sulfolane. The outlet, i.e., treated, gas had an H₂S partial pressure of 0.00036 mm. Hg, illustrating that the process greatly reduces the partial pressure of H₂S even when the initial H₂S partial pressure is quite low. Further, with lower concentrations of H₂S, a greater proportion of the H₂S is removed, i.e., in effect, each successive stage becomes more efficient.

EXAMPLE 17

A comparison of the loading capacities of various sweetening solutions is tabulated as follows:

| Solution | Loading capacity in— | |
|---|---|---|
| | S.c.f. sour gas/ gallon solution | Vol. sour gas/vol. solution |
| A. 15 weight percent monethanolamine in H₂O, at 40 mol percent loading | 2.9 | 21.9 |
| B. 25 weight percent diethanolamine in H₂O, at 71 mol percent loading | 5.2 | 38.9 |
| C. Sulfinol (40% diisopropanolamine, 10% H₂O, 50% sulfolane) [1] | {[2] 6.25<br>{[3] 13.25. | 46.7<br>99.1 |
| D. Isophthalonitrile at indicated conc., 0.01–0.5 gram mol KHS per gram equivalent nitrile, in N-methyl-2-pyrrolidone, 100% stoichiometric loading IPN weight percent equal: | | |
| 5 | 2.55 | 19.1 |
| 10 | [4] 5.13 | 38.3 |
| 15 | 7.73 | 57.8 |

[1] From USP 3,347,621.
[2] At 50 p.s.i.a. H₂S partial pressure.
[3] At 250 p.s.i.a. H₂S partial pressure.
[4] At any H₂S partial pressure as long as 100% stoichiometric loading is not exceeded.

As expected from our classification of sweetening processes, mentioned earlier, the loading capacity of the sulfinol solution is a function of the partial pressure of the $H_2S$ present, since this process is a combination of chemical reaction (acid-base reaction between DIPA and $H_2S$) and physical solution (physical solution of $H_2S$ in sulfolane). A and B are practically insensitive of the $H_2S$ partial pressure since they employ chemical reaction only. The numbers tabulated for D are for 100% stoichiometric loading. In the event the solvent is fully saturated also, the following loading capacities are obtained at 25° C.:

| $H_2S$ par. pr. p.s.i.a. | 5 wt. percent IPN plus KHS in NMP | | 10 wt. percent IPN plus KHS in NMP | | 15 wt. percent IPN plus KHS in NMP | |
|---|---|---|---|---|---|---|
| | S.c.f. $H_2S$/ gal. | Vol. $H_2S$/ vol. soln. | S.c.f. $H_2S$/ gal. | Vol. $H_2S$/ vol. soln. | S.c.f. $H_2S$/ gal. | Vol. $H_2S$/ vol. soln. |
| 50 | 15.5 | 115.7 | 14.1 | 105.7 | 15.2 | 113.9 |
| 250 | 67.1 | 502.1 | 50.1 | 375.0 | 45.2 | 338.4 |

Another significant point of difference between A, B, and C on one side and solution D on the other side is that the loading capacities for A, B, and C apply for the total sour gas, i.e., $H_2S$ and $CO_2$, whereas the loading capacities for D apply for the $H_2S$ only, provided less than and including 100% stoichiometric capacity is utilized.

The above results illustrate that the loading capacity of the various solutions D of the present invention invention compare favorably with those of the other solutions. Since the other solutions are generally used for the removal of high concentrations $H_2S$, the present invention can also be utilized successfully to remove $H_2S$ occurring at high concentrations.

EXAMPLE 18

Precipitation of reagent and reaction product by addition of water to a solution of IPN and NMP that had been used in a continuous $H_2S$-reaction-thermal regeneration cycling test can be carried out in the following manner: A solution, originally consisting of 14.95 wt. percent isophthalonitrile+0.28 wt. percent potassium hydrosulfide in N-methyl-2-pyrrolidone, which was used in a continuous $H_2S$-reaction-thermal regeneration cycling test for over 30 days was treated with different amounts of water at 74° F. The amounts of the resulting precipitates were determined quantitatively by weighing. The following table summarizes the results.

| Wt. percent $H_2O$ added: | Percent of total available solid material precipitated |
|---|---|
| 20.0 | 75 |
| 40.1 | >99 |
| 60.0 | >99 |
| 80.0 | >99 |

These results demonstrate the feasibility to separate the reagent and/or reaction product from the N-methyl-2-pyrrolidone solvent by addition of water to the used reaction solution of the present invention.

EXAMPLE 19

N-methyl-2-pyrrolidone can be used as a dehydrating agent in connection with the process, as previously stated. To illustrate this, a quantity of N-methyl-2-pyrrolidone with known water content was contacted with a water-presaturated nitrogen gas stream. The water contents of the liquid and of the treated gas were measured by gas chromatography at predetermined time intervals. For comparison purposes, the experiment was exactly duplicated using triethylene glycol as the contacting liquid. The results of these comparison tests are summarized as follows:

| Weight percent of contacting liquid | Dewpoint depression (° F.) of the treated gas when the contacting liquid is— | |
|---|---|---|
| | N-methyl-2-pyrrolidone | Triethylene glycol |
| 99.0 | 96 | 91 |
| 98.5 | 89 | 84 |
| 98.0 | 84 | 80 |
| 97.5 | 81 | 76 |

These results demonstrate that NMP is at least as good a dehydrating agent as TEG, which is a widely used dehydrating agent in the gas processing industry.

Numerous other examples can be given to illustrate the present invention and its many applications. For example, a particular application involves treating an $H_2S$ containing gas in a pipeline by concurrently contacting said gas with one of the contacting solutions described hereinabove and providing for accumulation of the $H_2S$ enriched solution such as in sumps, knockout drums, or the like so that the treated gas of reduced $H_2S$ content can continue on and the enriched solution removed for regeneration and recycle as desired.

We claim:

1. In the process for removing a sulfide from a moist or dry industrial gas stream by contacting the stream with an inert liquid solvent, the improvement which comprises including as a solute in said solvent an effective amount of an aromatic nitrile and a catalyst; said sulfide being selected from the group consisting of hydrogen sulfide and of hydrocarbon sulfides of the group consisting of mercaptans, monosulfides and disulfides; said solvent being substantially anhydrous and hydroxyl-free; said nitrile containing an electron-attracting substituent on the aromatic ring, said substituent having an attraction for electrons which is at least as strong as that of a halogen substituent; said catalyst being selected from the group of salts consisting of potassium, sodium, lithium, ammonium, and dimethyl ammonium hydrosulfides; said amount of the nitrile, based upon the solvent, being in the range 0.1 weight percent up to the solubility limit of the nitrile in the solvent; and said amount of the catalyst being in the range 0.01 to 0.5 gram mol per gram equivalent of the nitrile; and separating the resulting sulfide-enriched solution from the resulting sulfide-reduced gaseous mixture.

2. The process as in claim 1 wherein the sulfide is hydrogen sulfide.

3. The process as in claim 1 wherein said gas stream is a mixture of normally gaseous hydrocarbons, carbon dioxide and hydrogen sulfide.

4. The process as in claim 1 wherein said gas stream is a natural gas.

5. The process as in claim 1 wherein said gas stream is a flue gas.

6. The process as in claim 1 wherein said gas is a fuel gas.

7. The process as in claim 1 wherein said gas stream is a hydrogen gas stream which is contaminated with one or more of said sulfides.

8. The process as in claim 1 wherein said gas stream is a synthesis gas which is produced by partial oxidation of a sulfur-containing hydrocarbonaceous material.

9. The process as in claim 1 wherein said gas stream is obtained from an oil refinery operation.

10. The process as in claim 1 wherein said gas stream is a tail gas from a Claus furnace.

11. The process of claim 2 wherein said sulfide-enriched contacting solution is regenerated by heating and removing the dissociated sulfides.

12. The process of claim 2 wherein said solvent is a pyrrolidone.

13. The process of claim 12 wherein the gaseous mixture is substantially free of elemental sulfur and oxygen and other oxidizing agents, such as $SO_2$, that may cause formation of sulfur in the solution.

14. The process of claim 2 wherein said solvent is N-methyl-2-pyrrolidone and said contacting is carried out at a temperature below about 250° F.

15. The process of claim 2 wherein said substituted aromatic nitrile has an electron-attracting substituent at least as strong as halogen and is other than ortho dicyano benzene.

16. The process of claim 2 wherein said nitrile is isophthalonitrile.

17. The process of claim 2 wherein the solvent initially contains a compound capable of producing an alkali hydrosulfide under the reaction conditions.

18. The process of claim 2 wherein said alkali hydrosulfide is potassium hydrosulfide.

19. The process of claim 2 wherein a feed containing elemental sulfur is pretreated to remove elemental sulfur from the gaseous feed stream.

20. The process of claim 2 wherein the gaseous mixture is treated in a plurality of stages of contact with said solution of substituted aromatic nitrile having an electron-attracting substituent on the aromatic ring at least as strong as halogen and an alkali hydrosulfide or compound capable of producing said hydrosulfide, in a nonhydroxyl-containing solvent.

21. The process of claim 2 wherein the hydroxyl-free solvent of the contacting solution has dehydrating properties and the gas feed is dehydrated by contact in a separate zone with a portion of the same solvent, whereby any carryover from said dehydration step into the $H_2S$ removal zone does not adversely affect the contacting solution.

22. The process of claim 2 wherein $H_2S$ is selectively removed from a Claus furnace tail gas by contacting said gas with a portion of said contacting solution.

23. The process of claim 2 wherein said hydroxyl-free solvent is water-miscible and periodically at least a portion of said contacting solution is reclaimed by withdrawing said portion from the contacting system, adding to said withdrawn portion sufficient water to dissolve said solvent and to precipitate degradation products and other water-insoluble materials, separating the resulting aqueous solvent solution, and from said aqueous solution separating essentially water-free and purified solvent.

24. The process of claim 23 wherein said solvent is N-methyl pyrrolidone.

25. The process of claim 2 wherein a gaseous admixture of light hydrocarbons, $H_2S$ and $CO_2$ is contacted with said contacting solution whereby $H_2S$ is selectively removed from said admixture.

26. The process of claim 25 wherein $CO_2$ and light hydrocarbons accumulated in the contacting solution evince a partial pressure greater than 100 p.s.i. and said $CO_2$ and light hydrocarbons are rejected at least substantially by pressure reduction.

27. The process of claim 25 wherein hydrocarbons accumulated in said contacting solution are rejected by heating said contacting solution to a temperature below the point of dissociation of $H_2S$ from said solution.

28. The process of claim 25 wherein a gaseous admixture of light hydrocarbons, $H_2S$ and $CO_2$ is contacted countercurrently with said contacting solution to react with $H_2S$ selectively, separating the resulting $H_2S$-enriched solution from the gaseous admixture of reduced $H_2S$ content and regenerating said resulting $H_2S$ enriched solution by heating above the temperature at which the $H_2S$ dissociates from the solution.

29. The process of claim 25 wherein $CO_2$ and/or hydrocarbons accumulated are separated from the contacting solution and then the remaining $H_2S$-enriched solution is regenerated.

References Cited
UNITED STATES PATENTS

| | | | |
|---|---|---|---|
| 1,580,451 | 4/1926 | Sperr, Jr. | 23—181 |
| 3,039,251 | 6/1962 | Kamlet | 23—2 X |
| 3,120,993 | 2/1964 | Thormann et al. | 23—2 |
| 3,350,847 | 11/1967 | Woertz et al. | 55—73 X |
| 3,352,631 | 11/1967 | Zarker | 23—2 |

EARL C. THOMAS, Primary Examiner

U.S. Cl. X.R.

55—73; 260—551 R; 423—226, 245

PO-1050
(5/69)

UNITED STATES PATENT OFFICE
CERTIFICATE OF CORRECTION

Patent No. 3,767,766  Dated  October 23, 1973

Inventor(s)  Giok H. Tjoa and Karl H. Kilgren

It is certified that error appears in the above-identified patent and that said Letters Patent are hereby corrected as shown below:

Col. 2, line 12, "neutraliation" should read --neutralization--.

Col. 3, line 11, "inconvenienve" should read --inconvenience--.

Col. 4, line 52, "nitrole" should read --nitrile--.

Col. 4, line 73, "thiol-imide" should read --thiolimide--.

Col. 5, line 7, "stron" should read --strong--.

Col. 6, line 15, "$CO_2$" should read --$SO_2$--.

Col. 7, line 2, "suubsequently" should read --subsequently--.

Col. 7, line 6, "soltuion" should read --solution--.

Col. 8, line 6, "Clause" should read --Claus--.

Col. 8, line 66, "such a" should read --such as--.

Col. 10, lines 59-60, "a dust prevent" should read --a dust scrubber, filter, cyclone separator, etc., can be used to prevent--.

Col. 12, line 31, "13,00 X $10^{-5}$" should read --13,000 X $10^{-5}$--.

Col. 12, second to last line, Table I, "N-methy" should read --N-methyl--.

Col. 14, line 18 to the bottom of Table III, line 41, should follow line 8 of Column 14; Column 14, lines 9-11, should follow Table III, i.e., be below line 40 of Column 14.

Col. 15, line 47, "Tablh VI" should read --Table VI--.

Col. 16, lines 64-65, "content saturated" should read --content of the inlet and outlet gas, the contacting solution was then saturated--.

Col. 18, last line, Table XI, "5.75" should read --7.75--.

Signed and sealed this 16th day of April 1974.

(SEAL)
Attest:

EDWARD M. FLETCHER, JR.
Attesting Officer

C. MARSHALL DANN
Commissioner of Patents